UNITED STATES PATENT OFFICE.

HARRY KIRCHHOFF, OF WOLFEN, GERMANY, ASSIGNOR TO THE ACTIEN-GESELLSCHAFT FÜR ANILIN FABRIKATION, OF SAME PLACE.

RED DYE.

SPECIFICATION forming part of Letters Patent No. 617,963, dated January 17, 1899.

Application filed July 14, 1898. Serial No. 685,942. (No specimens.)

*To all whom it may concern:*

Be it known that I, HARRY KIRCHHOFF, of Wolfen, District of Bitterfeld, in the Kingdom of Prussia, German Empire, have invented new and useful Improvements in the Manufacture of Red Dye; and I do hereby declare that the following is a full, clear, and exact description of the invention, which will enable others skilled in the art to which it appertains to make and use the same.

The invention relates to the production of a new coloring-matter by means of the naphtholsulfamidosulfonic acid described in German Patent No. 53,934. This acid has already been used for preparing azo dyes by combining the same with certain diazo compounds. (Compare German Patent No. 57,484.) As far as is known, the dyestuffs described in the before-mentioned patent have not been produced on a large scale or been brought into the market. Most probably the reason for this was that the shades obtained with these dyes were either too yellowish or too dull and did not possess the pure bluish-red tint which is necessary for products intended to be used together with other uniformly-dyeing coloring-matters.

I have now discovered that by combining the aforesaid naphtholsulfamidosulfonic acid with the diazo compound of metaämidoparacresol-ether a dyestuff may be obtained which dyes wool very clear red shades of bluish tint. The coloring-matter is therefore very well suited for dyeing uniform shades in mixture with other coloring-matters.

For practically carrying out my invention I may proceed as follows: Fourteen kilograms metaämidoparacresolmethyl-ether ($CH_3$: $NH_2$: $OCH_3 = 1:3:4$) are diazotized by means of hydrochloric acid and nitrite in the well-known manner. The solution of the diazo compound is allowed to run into a solution of 32.5 kilograms of the sodium salt of naphtholsulfamidosulfonic acid kept alkaline by the addition of carbonate of soda. The mixture is well stirred for some time. The coloring-matter formed separates almost entirely in the form of a crystalline precipitate. By addition of salt the dye is precipitated completely, pressed, and dried.

The dyestuff forms in dry state a dark-brown powder with metallic luster, soluble in cold (more readily in hot) water, with magenta-red color, which on addition of caustic-soda lye becomes more yellowish. From the hot aqueous solution of the coloring-matter the free-color acid is precipitated on addition of mineral acids in the form of small needles of metallic luster. The coloring-matter is but sparingly soluble in alcohol. Concentrated sulfuric acid dissolves the dyestuff with violet color, which on diluting with water turns at first into red, while on further diluting the free-color acid separates in the form of dark-brown flakes.

The coloring-matter dyes wool very clear red shades of bluish tint and is therefore very well suited for dyeing uniform shades in mixture with other coloring-matters.

Having now described my invention, what I claim is—

The hereinbefore-described dye produced by combining one molecule of diazotized meta-amidoparacresol-ether with one molecule of a salt of naphtholsulfamidosulfonic acid, being soluble in cold but more readily in hot water with magenta-red color, which on addition of an excess of caustic-soda lye becomes more yellowish, sparingly soluble in alcohol; dissolving in concentrated sulfuric acid with violet color, which on diluting with water turns at first into red while on further diluting the free-color acid separates in the form of dark-brown flakes, said dye producing on wool clear red shades of bluish tint.

In testimony whereof I hereunto set my hand and affix my seal, in the presence of two witnesses, this 29th day of June, 1898.

H. KIRCHHOFF. [L. S.]

Witnesses:
C. H. DAY,
HENRY HASPER.